United States Patent [19]

McConnell

[11] Patent Number: 4,680,870

[45] Date of Patent: Jul. 21, 1987

[54] DEVICE AND METHOD FOR DECODING CYLINDER LOCKS

[76] Inventor: T. Doyle McConnell, 15834 NE. Glisan, Portland, Oreg. 97230

[21] Appl. No.: 918,529

[22] Filed: Oct. 14, 1986

[51] Int. Cl.[4] ................................................ G01B 5/20
[52] U.S. Cl. ....................................................... 33/540
[58] Field of Search ...................... 33/539, 540; 70/394

[56] References Cited

U.S. PATENT DOCUMENTS

| | | | |
|---|---|---|---|
| 1,991,151 | 2/1935 | Hansen | 33/540 |
| 2,087,423 | 7/1937 | Abrams | 33/540 |
| 2,257,054 | 9/1941 | Hoffman | 33/540 |
| 2,338,768 | 1/1944 | Johnstone | 33/540 |
| 2,720,032 | 10/1955 | Harwell | 70/394 |
| 2,727,312 | 12/1955 | Tampke | 33/540 |
| 2,791,840 | 5/1957 | Harwell | 33/540 |
| 3,087,050 | 4/1963 | Rubens | 240/4.4 |
| 3,827,151 | 8/1974 | Naill | 33/540 |
| 4,185,482 | 1/1980 | Nail | 70/394 |
| 4,186,577 | 2/1980 | Jarm | 70/394 |
| 4,517,746 | 5/1985 | Easley | 33/549 |

FOREIGN PATENT DOCUMENTS 72143 2/1983 European Pat. Off. ............. 33/540

*Primary Examiner*—Richard R. Stearns
*Attorney, Agent, or Firm*—Chernoff, Vilhauer, McClung & Stenzel

[57] ABSTRACT

A device for decoding a cylinder lock of the wafer type includes a main portion having a shank similar to an uncut blank for a key for a particular lock and a thin feeler which slides along one side of the portion resembling a key blank. A notch is defined in the portion resembling a key blank, to receive a tumbler of the lock in a normal locking position for that tumbler while the feeler is placed into contact with the tumbler. Indicia are provided to indicate the position of the feeler with respect to the notch, in terms of nominal cut depths to which corresponding portions of a key must be cut to produce a key which will operate the lock. In one embodiment the feeler includes a sloping forward face which contacts a tumbler. In another embodiment of the invention the feeler includes a series of steps, each step corresponding to a particular nominal depth of cut for a position of a key to fit that tumbler of the lock into which the feeler is able to fit.

11 Claims, 8 Drawing Figures

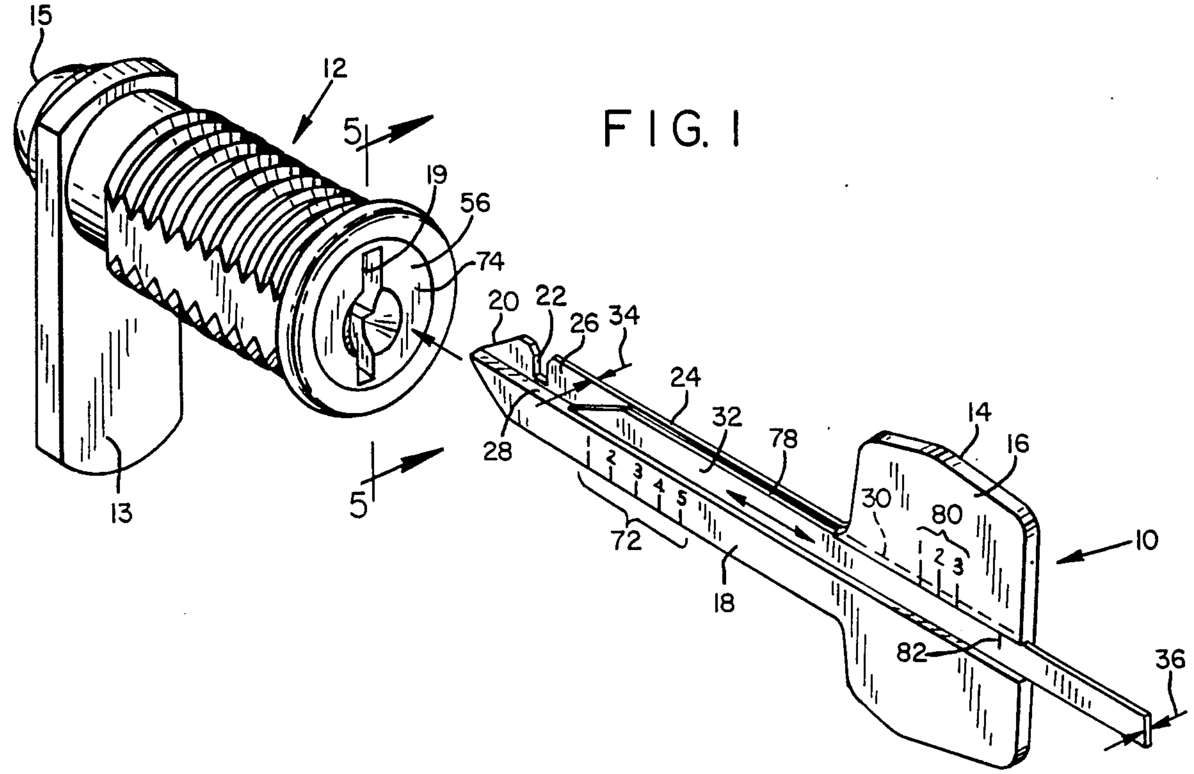
FIG. 1
FIG. 2
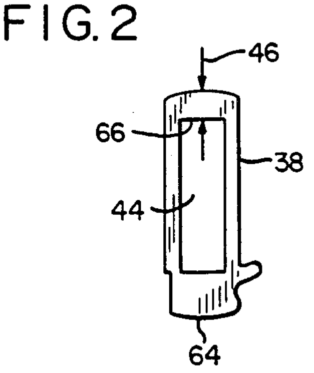
FIG. 3
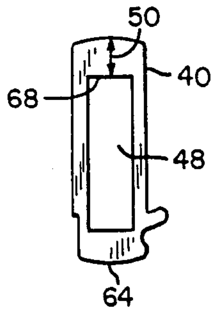
FIG. 4
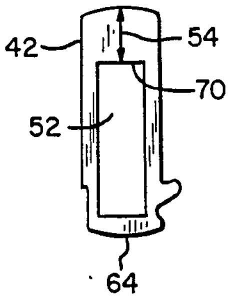

DEVICE AND METHOD FOR DECODING CYLINDER LOCKS

BACKGROUND OF THE INVENTION

The present invention relates to cylinder locks, and particularly to a device and method for its use for determining the required profile for a key for such a lock, without first unlocking the lock.

Cylinder locks are of several types such as those including pin tumblers and those including wafer tumblers which must be pushed into the proper positions by inserting a key into a keyhole in the cylinder of the lock in order for the cylinder of the lock to be turned relative to the outer casing. When the proper key is used the pin tumblers or wafer tumblers are moved to a position in which each tumbler is located within the volume defined generally by the outer surface of the cylinder of the lock. If the profile of the key is not correct, however, one or more of the tumblers extends from the inner cylinder into an appropriate groove in the surrounding casing, preventing the cylinder from being turned relative to the casing.

When the key from a lock has been lost a new key can be made by disassembling the lock to determine the proper profile, but this is often a very expensive procedure, because of the amount of time required to remove the lock from, for example, a door of an automobile. It is therefore desired to construct a new key without having to disassemble the lock.

As shown in Rubens U.S. Pat. No. 3,087,050 it is known that cylinder locks having wafer tumblers can be decoded to permit a new key to be cut, without unlocking the lock, by visually observing the positions of the individual wafers with the aid of a lamp and a probe which is used to hold some of the tumbler wafers out of the line of sight while observing others. This method of decoding a lock requires accurate estimation of the position of each tumbler within the lock, which may be difficult, because of the small differences in locations of tumbler positions, or because of reflections of light within the lock.

Hansen U.S. Pat. No. 1,991,151 shows a device used for decoding cylinder locks, but the device shown by Hansen appears to be somewhat complex and to be somewhat slow to use. Other devices, such as those shown in Harwell U.S. Pat. Nos. 2,720,032 and 2,791,840, and in Abrams U.S. Pat. No. 2,087,423, Tampke U.S. Pat. No. 2,727,312, and Nail U.S. Pat. No. 4,185,482 require that a lock first be opened before those devices can be used to determine the correct profile of a key for the lock. That is, the tumblers must all be moved to the position in which the break line of each tumbler corresponds with the surface between the inner and outer cylinders of the lock.

Johnstone U.S. Pat. No. 2,338,768, and Jarm U.S. Pat. No. 4,186,577 show devices which aid in picking cylinder locks. Johnstone discloses a set of partial keys by which a lock can be opened by systematically trying different parts along a key shank to bring each tumbler into a position coinciding with the break line between the cylinder and the surrounding casing. European patent application 82303966.4 discloses a device for picking a lock, in which a device is used to raise all of the tumblers to a non-interfering position to permit insertion into the keyway of a device which can be used to make an impression of the tumblers as they are allowed to move into an unlocked position.

Easley U.S. Pat. No. 4,517,746 discloses a lock decoding device including a probe including stiff wires which are rotatable within the probe to determine the positions and types of individual wafers of a certain type of cylinder lock without opening the lock. What is needed, however, is a simpler device, for use with wafer-type cylinder locks, to determine the proper profile for a key for such a lock without first having to pick the lock.

Ordinarily, the wafers of a wafer-type cylinder lock are interchangeable to make the lock use a different key. Each wafer is cut to one of several different sets of dimensions corresponding to a notch of a particular depth, to be located at a point along the shank of a key for such a lock which corresponds with the position in which that particular wafer tumbler is located within the cylinder of the lock. Any one of two to five or more different wafers might be in any particular wafer position of the cylinder, and what is needed is a device to determine which wafer is in each position of the cylinder of the lock, without first having to pick and open the lock. In wafer-type cylinder locks of the type for which a preferred embodiment of the present invention is intended, a hole is provided centrally in each wafer, permitting the wafer to move within the cylinder when a key is inserted into the keyhole. The position of the hole relative to the ends of the wafer determines the required depth of the notch on the working surface of a key, for each wafer position of the cylinder of the lock.

SUMMARY OF THE INVENTION

The present invention overcomes the shortcomings of the prior art and provides a device and a method for its use for decoding a cylinder lock; that is, for determining the profile required for a key for a wafer-type cylinder lock, without having to unlock or disassemble the lock. In a preferred embodiment, a lock decoding device according to the present invention includes an elongate main body including a shank portion which fits within the keyway of the lock while the lock remains locked. The shank of the lock decoding device includes a notch which is deep enough to receive one wafer of the lock and allows that wafer to move to the position which it normally occupies when the lock is locked. The shank of the lock decoding device of the invention holds any wafers located closer to the face of the lock in a raised position, keeping them out of the way of a feeler which is inserted into the keyway alongside the shank of the lock decoding device.

The feeler used as a part of the lock decoding device of the present invention slides along the shank of the lock decoding device in a groove provided, until a front end of the feeler comes into contact with the key-engaging inner surface of the hole of the wafer located within the notch defined in the shank portion. Cooperating markings are provided on the feeler and on the head of the lock decoding device, to indicate the position of the front end of the feeler with respect to the notch in the shank.

The front end of the feeler may be inclined, or it may include steps corresponding to the different possible cut depths of a key for the lock, so that discrete positions of the feeler will be provided to indicate the proper cut for the respective tumbler position of a key.

It is, therefore, a principal object of the present invention to provide an improved and simplified device for decoding wafer-type cylinder locks to enable a locksmith to manufacture a key for a lock without having to open the lock.

It is another important object of the present invention to provide a device for accurately measuring the locations of the several tumblers of a cylinder lock while it remains locked.

It is a principal feature of the lock decoding device of the present invention that it includes a shank portion which holds other tumblers out of the way of a feeler used to determine the proper cut dimension for each tumbler of the lock, in turn, while the lock remains in a locked condition.

It is another important feature of the lock decoding device of the present invention that it includes a handle and a feeler which have markings which provide a visual indication of the position of the front end of the feeler relative to a tumbler located within a notch defined in the shank portion.

A further important feature of the lock decoding device of the present invention is the provision of indicia on the shank portion of the device to indicate which of the several tumblers is located within the notch provided on the shank portion of the device.

An important advantage of the lock decoding device of the present invention is that it does not require that the lock be opened in order for it to be decoded.

Another advantage of the lock decoding device of the present invention is that it is more sturdily constructed than previously known lock decoding devices for cylinder locks.

A further advantage of the present invention is that it provides a method which is simpler than the previously known methods for determining the proper profile for a key for a cylinder lock.

The foregoing and other objectives, features, and advantages of the invention will be more readily understood upon consideration of the following detailed description of the invention, taken in conjunction with the accompanying drawings.

BRIEF DESCRIPTION OF THE DRAWINGS

FIG. 1 is a perspective view of a lock decoding device according to the present invention, together with a cylinder lock of a type with which the lock decoding device of the present invention may be used.

FIGS. 2, 3, and 4 show front views of wafers of a type included as tumblers in the lock shown in FIG. 1.

DETAILED DESCRIPTION OF THE INVENTION

Figure 5:
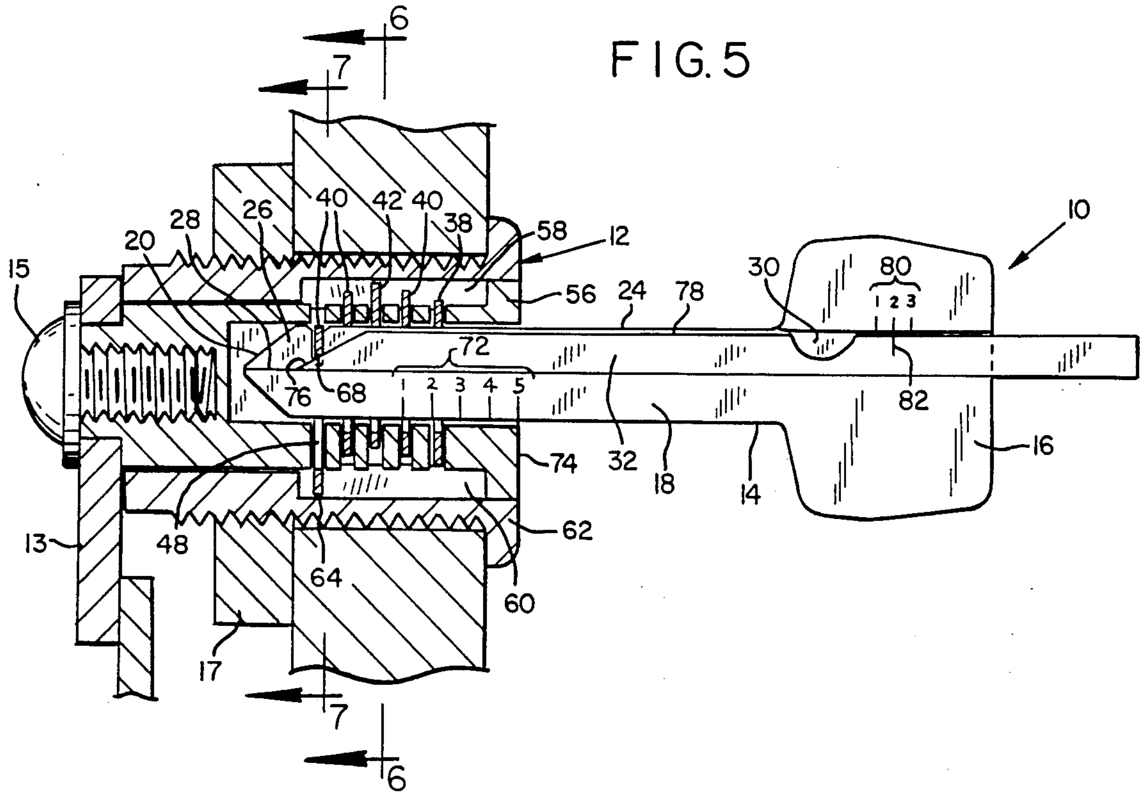
FIG. 5 is a sectional side view of the lock shown in FIG. 1, taken along line 5—5, and showing the lock decoding device of the present invention in use.
Figure 6:
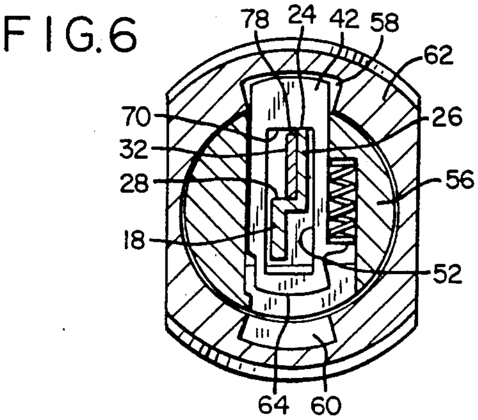
FIG. 6 is a sectional view of the lock shown in FIG. 1 taken along the line 6—6 of FIG. 5.

Referring now to the drawings, in FIG. 1 a lock decoding device 10 is shown together with a cylinder lock 12. A dog 13 is attached to the lock 12 by a screw 15 and retains the cylinder 56 within the outer casing 62 of the lock. As shown in FIG. 5, a nut 17 holds the lock 12 in position, while the dog 13 is rotatable by the cylinder 56 when the lock is unlocked by the properly profiled key extending through the keyhole 19 into the keyway extending axially within the cylinder 56.

The lock decoding device 10 includes a main body 14 is similar to a key blank for the cylinder lock 12, including a handle 16, similar to the head of a key, and a shank 18. The shank 18 includes a sloped nose surface 20 and a notch 22 spaced a short distance away from the nose surface 20 along an upper margin 24 of an upper portion 26 of the shank 18. The upper portion 26 and upper margin 24 are narrower than the corresponding portions of an ordinary key blank, and a medial surface 28 is wider than the corresponding surface of a key for the lock 12. A groove 30 extends across the handle 16, aligned with the upper portion 26 and medial surface 28 as a guide for a feeler 32. The thickness 34 of the upper portion 26, and the thickness 36 of the feeler 32 are both small enough so that the total of the thicknesses 34 and 36 is small enough to fit within the keyhole of the cylinder lock 12.

It will be appreciated that the medial surface 28, for some locks, may be on the opposite side of the upper portion 26, depending upon the shape of the keyhole of the particular lock concerned. It will also be appreciated that the upper portion 26 corresponds to that portion of a key for a particular cylinder lock which is ordinarily cut or ground to the necessary profile to hold the tumblers in the correct position for opening the lock. Thus, the upper portion 26 may, in fact, be located otherwise than upward, depending upon the orientation of the lock 12.

Referring now also to FIGS. 2–7, the lock 12 is a typical wafer-type cylinder lock including a set of five wafer tumblers such as the wafers 38, 40, and 42 shown in FIGS. 2, 3, and 4.

As may be seen in FIG. 2, the wafer 38 defines an opening 44 a distance 46 away from its upper end, while the wafer 40 shown in FIG. 3 defines an opening 48 establishing a distance 50, greater than the distance 46, from the upper end of the wafer 40. Similarly, the wafer 42, shown in FIG. 4, defines an opening 52 located a distance 54 from the upper end of the wafer 42. The distance 54 is greater than the distance 50.

In a key cut to operate a lock such as the lock 12, for a position in which a wafer 38 is present, a notch of a particular depth, which may be referred to as a number one cut, is necessary to raise the wafer 38 to a position in which its ends are aligned with the surface of the inner cylinder 56 of the lock. Should a key be inserted into the lock 12 so that any notch other than a number one cut is located within the opening 44, the wafer 38 would extend into one of the grooves 58 and 60 defined by the outer case 62 of the lock 12, within which the cylinder 56 is located.

For a wafer 40, a cut or notch of a greater depth is needed in the position of a key where a wafer 40 is located, because of the greater distance 50. Because of the yet greater distance 54 between the opening 52 and the upper end of the wafer 42, yet a deeper cut, referred to herein as a number three cut, is required in a key in the position corresponding to the position of a wafer 42 in the lock 12.

Each wafer is located in a respective position in the lock 12 commonly referred to by numbering serially beginning nearest the face 74 of the cylinder 56 of the lock, as may be seen by referring to FIG. 5. Because the wafers 38, 40, and 42 are identical and interchangeable, except for the location of the openings 44, 48 and 52, and the corresponding distances 46, 50, and 54, the bottom end 64 of each wafer is located within the groove 60 of the casing 62, preventing the cylinder 56 from turning relative to the casing 62, unless a key is in the lock. Because each wafer must move the same distance from a locked position to an unlocked position within the cylinder 56, however, the different distances 46, 50, and 54 result in the upper interior surface 66 of the opening 44, the upper interior surface 68 of the opening 48, and the upper interior surface 70 of the opening 52 being at different heights when the respective wafers 38, 40, and 42 are in their locking positions. Thus, to determine what depth of cut is required at each wafer position of a key to open a lock, it is sufficient to know the position of the upper interior surface of the hole in each wafer when that wafer is in a locking position, with its bottom end 64 located within the groove 60.

In accordance with the present invention, the shank 18 of the lock decoding device 10 is provided with indicia 72 to indicate, by reference with the face 74 of the cylinder 56, which of the several wafers within the cylinder 56 is aligned with the notch 22 defined in the upper portion 26 of the shank 18.

Because the nose surface 20 is sloped with an inclination similar to that of the front of a key for the lock 12, as the shank 18 is inserted into the lock 12, each wafer is pushed upward so that its upper end extends upwardly into the groove 58 by contact of the nose surface 20 with the upper interior surface 66, 68, or 70 of the wafer. When only the shank 18 is inserted into the lock, the wafer in position one, closest to the face 74 of the cylinder 56 is free to drop into the notch 22. The notch 22 is deep enough to provide ample clearance for the wafer requiring the deepest cut, in this case a wafer 43, and the medial surface 28 is similarly located lower than the height of the upper interior surface of the hole in such a wafer. Insertion of the feeler 32, or a similar device having an inclined forward surface similar to the inclined forward surface 76 of the feeler 32, will therefore raise any wafer from the notch 22 and permit the shank to be inserted further into the cylinder 56. The upper margin 24 of the shank 18 is chamfered on either side of the notch 22, where the sides of the notch 22 meet the upper margin 24, when the feeler 32 is resting along the medial surface 28 and within the groove 30. This enables each of the wafers to ride up onto the upper margin 24 as the shank 18 is inserted into the cylinder 56 beyond the number one wafer position although the upper margin 78 of the feeler 32 is not quite as high as the upper margin 24 above the medial surface 28, as will be clear from FIGS. 5 and 6.

Figure 7:
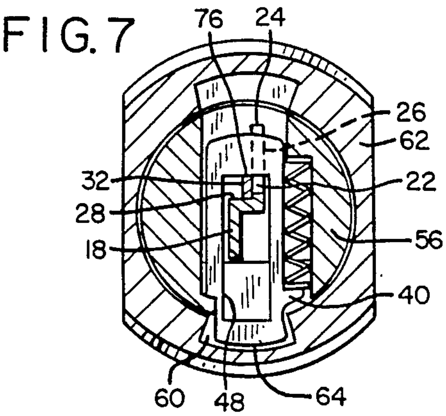
FIG. 7 is a sectional view of the lock shown in FIG. 1, taken along line 7—7 of FIG. 5.

As shown in FIG. 5, the shank 18 has been inserted until the notch 22 is aligned with wafer position five of the cylinder 56. The wafer 40 of position five of the lock 12 is located in the notch 22 and has been urged into its normal locking position by its associated spring. As a result, the bottom end 64 of the wafer 40 located in position five of the cylinder 56 is within the groove 60 at the bottom of the casing 62, as shown in FIGS. 5 and 7, and the upper interior surfaces of the openings of the wafers in positions closer to the face 74 than any wafer located within the notch 22 will not cause friction against the upper margin 78 of the feeler 32.

It will be noted that indicia 80 are provided on the handle 16 of the main body 14, and that an indicator mark 82 is provided on the face of the feeler 32. When the feeler 32 is moved along the shank 18 until its inclined forward surface 76 encounters the upper interior surface 66, 68 or 70 of a wafer located in the notch 22, the indicator mark 82 will be aligned with a particular mark of the indicia 80. For example, the indicator mark 82 is aligned with the mark labeled "2" of the indicia 80, in FIG. 5, where the inclined upper surface 76 is in contact with the upper interior surface 68 of the wafer 40 which is located within the notch 22. By referring to the indicia 72, it will be noted that the mark indicating the fifth wafer position is aligned with the face 74 of the cylinder 56 so that the lock decoding device 10 provides an indication that the wafer in position five requires a number two cut in the number five position of a key for that lock 12.

In order to decode a lock and manufacture a key to fit a lock which is locked, without having to pick the lock in order to determine the required key profile, then, it is necessary only to use the lock decoding device 10 of the present invention made for the particular type of lock. The type of lock which can be determined by reference to an available directory, entered by the application, such as a model and year of automobile. The relative location of the feeler 32 with respect to the main body 14, as shown by the indicia 80 and the mark 82, indicates the proper cut for a key for the wafer located in each of the wafer positions in turn, as explained above in detail with respect to the wafer in position five. Once the proper cut has been determined for each of the wafers, the feeler 32 is used to raise the final wafer from its position within the notch 22, and the shank 18 and feeler 32 are removed simultaneously from the lock.

Because the locks built by different manufacturers and used in different applications have different dimensions and may have different numbers of possible cuts for each wafer, it is easiest to refer to data provided by the manufacturer of the lock, in preparing a lock decoding device 10 according to the present invention, so that the indicia 80 will be accurate.

Once the proper cut has been determined for each wafer position of the cylinder lock 12, by use of the lock decoding device 10, the locksmith can refer to tables provided by lock manufacturers to select the proper key blank and cut the key to the proper profile according to the information provided by the manufacturer of the lock.

Figure 8:
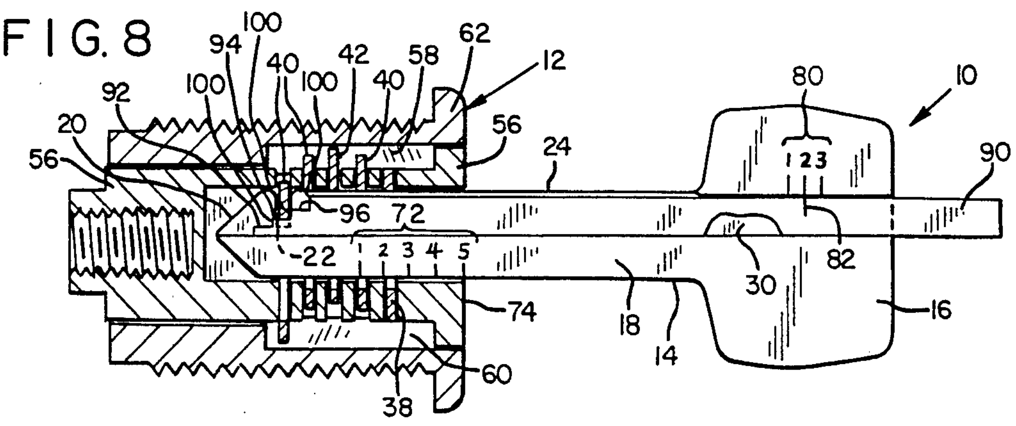
FIG. 8 is a view similar to that of FIG. 5, showing a lock decoding device which is an alternative embodiment of the present invention.

Because the wafers of a lock may become worn after extensive use, the indications provided by the indicia 80 and a feeler 32 for a particular lock may not be precise, as the slope of the inclined forward surface 76 of the feeler 32 must not be so shallow as to result in contact with the surface 76 against the upper interior surface of a wafer spaced further from the face 74 of the cylinder 56 than the wafer located in the notch 22. To avoid possible ambiguity resulting from a worn lock, an alternative to the inclined forward surface 76 of the feeler 32 is provided in the feeler 90 which has three parallel horizontal upper surfaces 92, 94, 96, corresponding to three different cut depths, as shown in FIG. 8. Vertical surfaces 100 interconnect the horizontal surfaces 92, 94, and 96 and act as positive stops to prevent the feeler 90 from proceeding into the central opening in a particular wafer beyond a position determined by the location of the opening within the wafer, when the wafer is located within the notch 22 of the shank 18. When using the feeler 90, it will be necessary to use a device, such as the feeler 32, which has an inclined upper front surface, such as the inclined forward surface 76 of the feeler 32, to raise each wafer clear from the notch 22 in order to move the shank 18 to a different wafer position within the cylinder 56 of the lock 12.

The terms and expressions which have been employed in the foregoing specification are used therein as terms of description and not of limitation, and there is no intention in the use of such terms and expressions of excluding equivalents of the features shown and described or portions thereof, it being recognized that the scope of the invention is defined and limited only by the claims which follow.

What is claimed is:

1. A device for decoding a cylinder lock of the type including a plurality of tumblers movable within a cylinder of the lock by a key having the correct profile, to determine the depth of cut required on a key for each tumbler position for such a lock, comprising:

(a) a main body including an elongate shank adapted to fit within the keyhole of the lock and handle means attached to said shank for manipulating said shank;

(b) an elongate feeler adapted to slide along said shank and including means for engaging a tumbler of said lock;

(c) said shank and said feeler having a combined thickness small enough for said shank and said feeler to fit together within said keyhole of said lock;

(d) means for defining a notch in said shank for holding a single tumbler, in a normal locking position, within said notch;

(e) first indicia means located on said shank for showing which of said plurality of tumblers is aligned with said notch; and (f) second indicia means located on said main body and said feeler for cooperatively showing the position of said feeler relative to said notch.

2. The device of claim 1 wherein said shank includes a sloped nose surface.

3. The device of claim 1 wherein said notch is deep enough not to interfere with movement of a tumbler held therein to any normal locking position for any such tumbler for said lock.

4. The device of claim 1 wherein said shank includes an upper margin which extends above said feeler and a longitudinal medial surface on which said feeler rests during use.

5. The device of claim 4 wherein said notch includes chamfered upper corners.

6. The device of claim 1 wherein said feeler includes an inclined forward surface and wherein said second indicia means includes a plurality of marks located on either one of said feeler and said handle means and at least one mark on the other of said feeler and said handle means for indicating the position of said inclined forward surface relative to said notch.

7. A device for decoding a cylinder lock of the type including a plurality of tumblers movable within a cylinder of the lock by a key having the correct profile, to determine the depth of cut required for each tumbler position along a key for such a lock, the device comprising:

(a) shank means for defining a tumbler-receiving notch and capable of holding ones of said plurality of tumblers other than one located within said notch in a predetermined position;

(b) handle means extending from said shank means for manipulating said shank means;

(c) tumbler lifting means for moving a predetermined one of said plurality of tumblers into a position permitting insertion of said shank means within said lock so that said notch passes into said lock beyond said predetermined one of said plurality of tumblers;

(d) a feeler slideable along said shank means, said feeler including feeler surface means for engaging a tumbler held within said notch; and (e) indicia associated with said handle means and said feeler for indicating the position of said feeler with respect to said shank means.

8. The device of claim 7, wherein said tumbler lifting means is slidable along said shank means into said lock and includes an inclined tumbler-engaging forward surface.

9. A method of decoding a cylinder lock of the type including a plurality of tumblers arranged axially along a cylinder of the lock, comprising:

(a) placing a shank portion of a decoding device a predetermined distance into the keyway of a lock while the lock remains locked;

(b) holding a single tumbler in its normal locking position relative to the cylinder of the lock, with a portion of said single tumbler extending into a notch defined in said shank portion of the decoding device;

(c) moving a feeler having a predetermined shape longitudinally along said shank portion until a portion of said feeler touches a surface of said single tumbler which is normally in contact with a key when said key holds the lock in an unlocked condition;

(d) observing the longitudinal position of said feeler relative to the shank portion while said feeler remains in contact with said single tumbler and said single tumbler remains in its normal locking position; and (e) from the result of step (d), determining the proper dimension for a portion of a key for the lock.

10. The method of claim 9 wherein said cylinder lock is of the type having wafer tumblers, each wafer tumbler defining a hole having an interior surface which is said surface which is normally in contact with a key.

11. A method for decoding a locked cylinder lock of the type having a face and a keyway extending axially from said face along a cylinder which is rotatable only when each of a plurality of tumblers has first been moved to a respective predetermined position, the method comprising:

(a) placing an elongate shank of a reference body into said lock to a predetermined position with respect to one tumbler of said plurality of tumblers and holding said shank in said predetermined position with said one tumbler in a locking position within said lock;

(b) inserting a feeler into said lock along said shank of said reference body;

(c) holding any other tumblers of said plurality of tumblers located between said one tumbler said face of said lock in a predetermined position clear of said feeler;

(d) placing a predetermined surface of said feeler in contact with said one tumbler of said lock without moving said one tumbler from a locking position;

(e) observing the position of said feeler relative to said reference body when said predetermined surface of said feeler is thus in contact with said one tumbler;

(f) determining the location of a key-engaging surface of said one tumbler from said position of said feeler observed during step (c), on the basis of a predetermined relationship between said feeler and said reference body; and (g) repeating steps (a) through (f) with respect to each other tumbler of said plurality of tumblers.

* * * * *